(12) United States Patent
Takeshita et al.

(10) Patent No.: US 10,408,216 B2
(45) Date of Patent: Sep. 10, 2019

(54) FAN MOTOR

(71) Applicant: Nidec Corporation, Kyoto (JP)

(72) Inventors: Hidenobu Takeshita, Kyoto (JP); Yasuyuki Kaji, Kyoto (JP); Tatsuki Yoshida, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 261 days.

(21) Appl. No.: 15/498,820

(22) Filed: Apr. 27, 2017

(65) Prior Publication Data
US 2017/0321707 A1 Nov. 9, 2017

(30) Foreign Application Priority Data

May 9, 2016 (JP) ................................. 2016-094158

(51) Int. Cl.
*F04D 25/06* (2006.01)
*F04D 19/00* (2006.01)
*F04D 29/32* (2006.01)
*F04D 29/52* (2006.01)
*H02K 5/22* (2006.01)
*H02K 7/14* (2006.01)

(52) U.S. Cl.
CPC ....... *F04D 25/0693* (2013.01); *F04D 19/002* (2013.01); *F04D 29/325* (2013.01); *F04D 29/522* (2013.01); *H02K 5/225* (2013.01); *H02K 7/14* (2013.01)

(58) Field of Classification Search
CPC .. F04D 25/0613; F04D 25/0693; F04D 25/08; F04D 29/526; H05K 7/20136; H05K 7/20145; H05K 7/20172
See application file for complete search history.

(56) References Cited

U.S. PATENT DOCUMENTS

| 5,699,854 A * | 12/1997 | Hong | ....................... F04D 25/08 165/121 |
| 6,174,145 B1 * | 1/2001 | Taniguchi | ............... F04D 25/08 417/423.14 |
| 6,431,910 B1 | 8/2002 | Chuang et al. | |
| 6,942,471 B2 * | 9/2005 | Weisser | .................. F04D 25/08 417/423.1 |

(Continued)

FOREIGN PATENT DOCUMENTS

CN 103511345 A 1/2014

*Primary Examiner* — Patrick Hamo
(74) *Attorney, Agent, or Firm* — Keating & Bennett, LLP

(57) ABSTRACT

A fan motor includes an electric motor including a stationary unit and a rotary unit, an impeller including blades and rotating together with the rotary unit, a housing accommodating the electric motor and the impeller, lead wires connected to the electric motor and extending radially outward, and a guide member. The housing includes a tubular portion extending along a rotation axis and accommodating at least a part of the impeller, a flange portion protruding radially outward from at least a part of the tubular portion, a lead wire outlet port provided in at least a part of the tubular portion, and a vertical groove communicating with the lead wire outlet port and penetrating the flange portion in an axial direction. The guide member is disposed inside the vertical groove, and at least a part of the lead wires is accommodated radially inward of the guide member in the vertical groove.

19 Claims, 12 Drawing Sheets

(56) References Cited

U.S. PATENT DOCUMENTS

| | | | | |
|---|---|---|---|---|
| 7,172,390 | B2* | 2/2007 | Lu | H05K 7/20172 415/213.1 |
| 7,358,631 | B2* | 4/2008 | Morishitahara | F04D 25/0613 310/71 |
| 7,811,069 | B2* | 10/2010 | Fleig | F04D 25/0613 417/423.1 |
| 8,297,950 | B2* | 10/2012 | Horng | F04D 25/0693 417/423.14 |
| 2003/0000684 | A1 | 1/2003 | Huang et al. | |
| 2007/0099459 | A1 | 5/2007 | Otsuki et al. | |
| 2007/0153552 | A1* | 7/2007 | Huang | F04D 25/0613 362/656 |
| 2007/0280840 | A1* | 12/2007 | Sugiyama | F04D 25/0613 417/423.5 |

* cited by examiner

FAN MOTOR

CROSS REFERENCE TO RELATED APPLICATIONS

This application claims the benefit of priority to Japanese Patent Application No. 2016-094158 filed on May 9, 2016. The entire contents of this application are hereby incorporated herein by reference.

BACKGROUND OF THE INVENTION

1. Field of the Invention

The present invention relates to a fan motor.

2. Description of the Related Art

Conventionally, there is known an axial flow type fan motor that rotates an impeller with a driving force of an electric motor to generate an air flow in an axial direction. The axial flow type fan motor is mounted on, for example, a household electric appliance, an office automation device, a transportation device or the like, and is used for the purpose of cooling an electronic part or circulating a gas inside a device casing. In some cases, a fan motor is used to circulate a gas in a server room where many electronic devices are installed. A conventional fan motor is described in, for example, Chinese Patent Application Publication No. 103511345.

The fan motor described in Chinese Patent Application Publication No. 103511345 has a frame structure in which an electric motor and an impeller are accommodated. By using a first groove provided in a frame and a second groove provided in a convex block, it is possible to arrange various routes while holding a power supply wire connected to the electric motor. Therefore, the fan motor can be adapted to various devices.

However, in the structure of the specification of Chinese patent Application Publication No. 103511345, there is a possibility that the power supply wire hooked on the frame may come off radially outward from a gap between the flange portion of the frame and the convex block. In that case, there is a possibility that the device, to which the fan motor is attached, and the power supply wire interfere with each other, thereby causing damage.

SUMMARY OF THE INVENTION

In accordance with a preferred embodiment of the present invention, there is provided a fan motor, including: an electric motor including a stationary unit and a rotary unit arranged to rotate about a vertically extending rotation axis; an impeller including a plurality of blades and rotating together with the rotary unit; a housing arranged to accommodate the electric motor and the impeller therein; one or more lead wires connected to the electric motor and extending radially outward; and a plate-like guide member, wherein the housing includes a tubular portion extending along the rotation axis and arranged to accommodate at least a part of the impeller therein, a flange portion protruding radially outward from at least a part of the tubular portion, a lead wire outlet port provided in at least a part of the tubular portion, and a vertical groove communicating with the lead wire outlet port and penetrating the flange portion in an axial direction, the guide member is disposed inside the vertical groove, and at least a part of the lead wires is accommodated radially inward of the guide member in the vertical groove.

According to the first preferred embodiment of the present invention, in the fan motor, the lead wire drawn out from the electric motor can be easily held in the housing. As a result, it is possible to suppress the outward coming-off of the lead wire from the housing or the deflection of the lead wire.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Exemplary preferred embodiments of the present invention will now be described with reference to the drawings. In the following description, the direction parallel to the rotation axis of the fan motor will be referred to as "axial direction", the direction orthogonal to the rotation axis of the fan motor will be referred to as "radial direction", and the direction along the circular arc about the rotation axis of the fan motor will be referred to as "circumferential direction".

Furthermore, in the following description, the side (the upper side in FIG. 1) on which air is drawn in the axial direction will be referred to as "intake side" or simply "upper side". The side (the lower side in FIG. 1) on which air is discharged in the axial direction will be referred to as "exhaust side" or simply "lower side". However, the "upper side" and the "lower side" are nothing more than expressions for the sake of convenience of description and are irrelevant to the direction of gravity. The fan motor according to the present invention may be used in any orientation.

Figure 1:
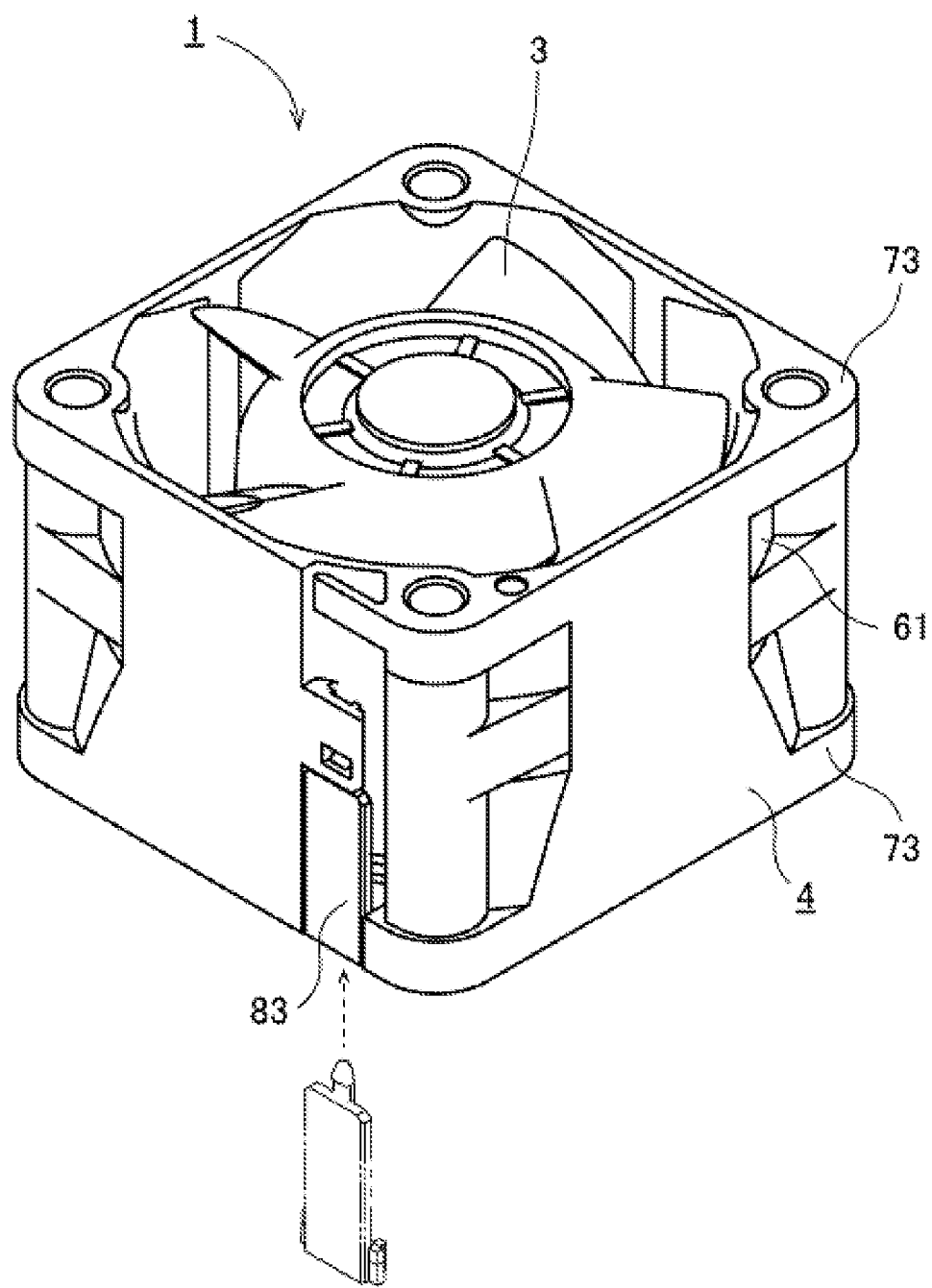
FIG. 1 is a perspective view of a fan motor according to a first preferred embodiment of the present invention.
Figure 2:
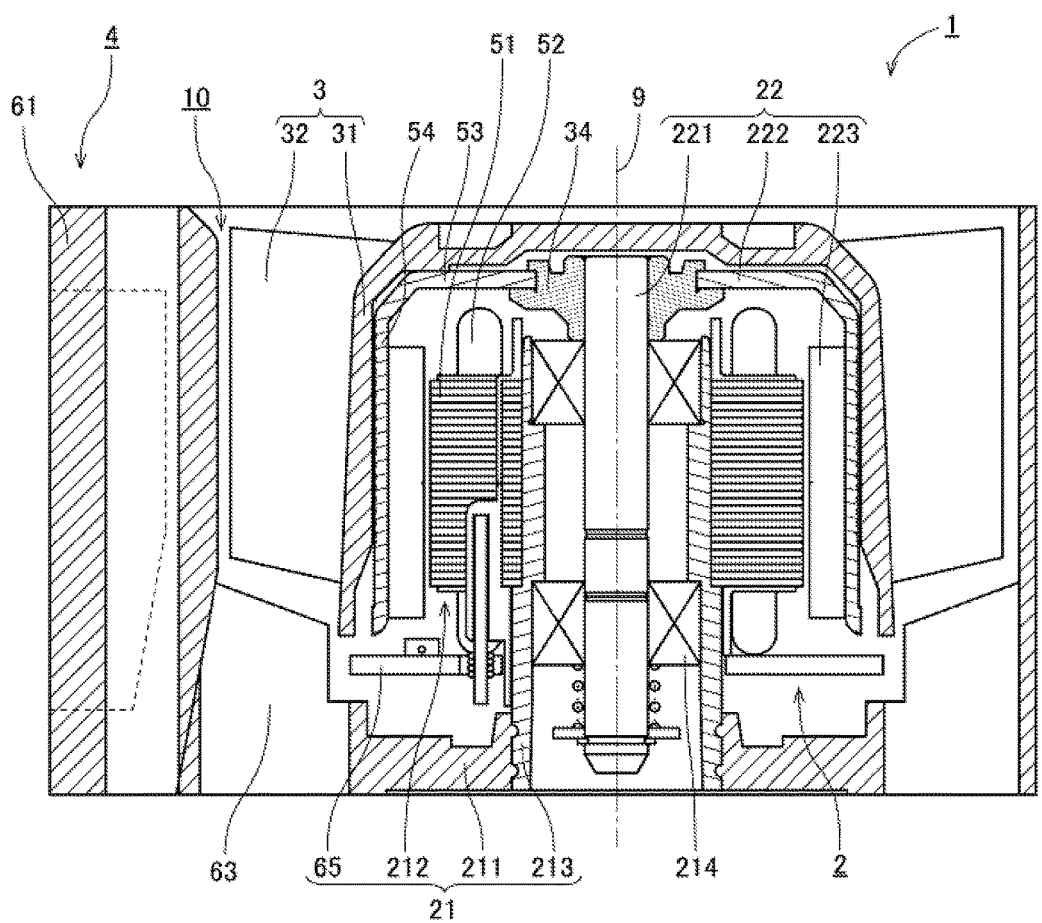
FIG. 2 is a vertical sectional view of the fan motor according to the first preferred embodiment of the present invention.

FIG. 1 is a perspective view of a fan motor according to the present preferred embodiment. FIG. 2 is a vertical sectional view of the fan motor according to the present preferred embodiment.

The fan motor 1 is used, for example, as a device for supplying a cooling air flow to a household appliance such as a refrigerator or the like, or into a room such as a server room in which a plurality of electronic devices are disposed. The fan motor 1 may be used alone, or a plurality of fan motors 1 may be used in combination. For example, a plurality of fan motors 1 may be installed for one server room and may be simultaneously driven.

As shown in FIG. 2, the fan motor 1 preferably includes an electric motor 2, an impeller 3, and a housing 4. Further, the fan motor 1 preferably includes a plurality of lead wires 60 and a plate-like guide member 83 which will be described later. The fan motor 1 is an axial flow type fan motor that generates an air flow moving downward along a rotation axis 9. When the fan motor 1 is driven, air is drawn from the upper side of the fan motor 1, which is the intake side. The air is sent toward the lower side of the fan motor 1, which is the exhaust side, through a wind tunnel 10 in the housing 4.

The electric motor 2 preferably includes a stationary unit 21 and a rotary unit 22. The rotary unit 22 is rotatably supported with respect to the stationary unit 21. Further, the rotary unit 22 rotates about the rotation axis 9 extending vertically.

The stationary unit 21 preferably includes a base portion 211, a stator 212, a circuit board 65, and a bearing holder 213. The base portion 211 is a disk-shaped member disposed below the stator 212 and extending radially outward from the periphery of the bearing holder 213. The stator 212 is an armature fixed to the outer peripheral surface of the bearing holder 213. The stator 212 preferably includes a stator core 51 and a plurality of coils 52. The stator core 51 preferably includes a plurality of teeth extending in the radial direction. Each of the coils 52 is formed by a conductive wire wound around the teeth.

The bearing holder 213 is a cylindrical member extending along the rotation axis 9. The lower portion of the bearing holder 213 is fixed to the inner peripheral surface of the base portion 211, for example, by an adhesive. A bearing unit 214 is disposed radially inside the bearing holder 213. As the bearing unit 214, for example, a ball bearing is used. The outer race of the bearing unit 214 is fixed to the inner peripheral surface of the bearing holder 213. The inner race of the bearing unit 214 is fixed to a shaft 221, which will be described later, to support the shaft 221. As a result, the shaft 221 is rotatably supported with respect to the stationary unit 21. However, the electric motor 2 may include another type of bearing unit such as a sliding bearing, a fluid bearing or the like instead of the ball bearing.

The rotary unit 22 preferably includes a shaft 221, a rotor holder 222, and a magnet 223. The shaft 221 is a columnar member arranged along the rotation axis 9. The shaft 221 is rotatably supported by the bearing unit 214. When the electric motor is driven, the shaft 221 rotates about the rotation axis 9.

The rotor holder 222 is a closed-top cylindrical member including a disk-shaped rotor lid portion 53 extending substantially perpendicularly to the rotation axis 9 and a rotor cylinder portion 54 extending from the rotor lid portion 53 to the exhaust side. As the material of the rotor holder 222, for example, a metal or a resin is used. The central portion of the rotor lid portion 53 is fixed to the upper end portion of the shaft 221 via an annular member 34. As a result, the rotor holder 222 rotates together with the shaft 221. The rotor lid portion 53 is disposed on the intake side of the stationary unit 21. The rotor cylinder portion 54 is disposed radially outward of the stator 212. The magnet 223 is fixed to the inner peripheral surface of the rotor cylinder portion 54.

The impeller 3 preferably includes a cup portion 31 and a plurality of blades 32. The cup portion 31 covers the upper surface and the outer peripheral surface of the rotor holder 222. Each of the blades 32 extends radially outward from the outer peripheral surface of the cup portion 31. The impeller 3 rotates together with the rotary unit 22. The blades 32 are arranged at substantially equal intervals in the circumferential direction. The number of the blades 32 is not particularly limited.

The housing 4 is a casing that accommodates the electric motor 2 and the impeller 3 therein. The housing 4 preferably includes a tubular portion 61, a plurality of support portions 63, a plurality of flange portions 73, a lead wire outlet port 81, and a vertical groove 82, which will be described later.

The tubular portion 61 is a tubular region extending along the rotation axis 9. The tubular portion 61 extends in a substantially cylindrical shape on the radial outer side of the impeller 3. The tubular portion 61 accommodates at least a part of the impeller 3 therein.

Each of the support portions 63 extends radially inward from at least a part of the inner surface of the tubular portion 61 and is directly or indirectly connected to at least a part of the stationary unit 21. Thus, the position of the stationary unit 21 of the electric motor 2 with respect to the housing 4 is fixed. In the present preferred embodiment, the support portions 63 and the tubular portion 61 are formed as a single member by injection molding of a resin. Alternatively, the support portions 63 and the tubular portion 61 may be separate members.

The flange portions 73, which will be described later, protrude radially outward from at least a part of the upper end and the lower end of the tubular portion 61. In the present preferred embodiment, the flange portions 73 are provided at four locations in the circumferential direction. By screw-fixing the flange portions 73, the fan motor 1 is attached to the frame body of a household electric appliance or the like. However, the flange portions 73 may be provided only in one of the upper end and the lower end of the tubular portion 61.

Figure 3:
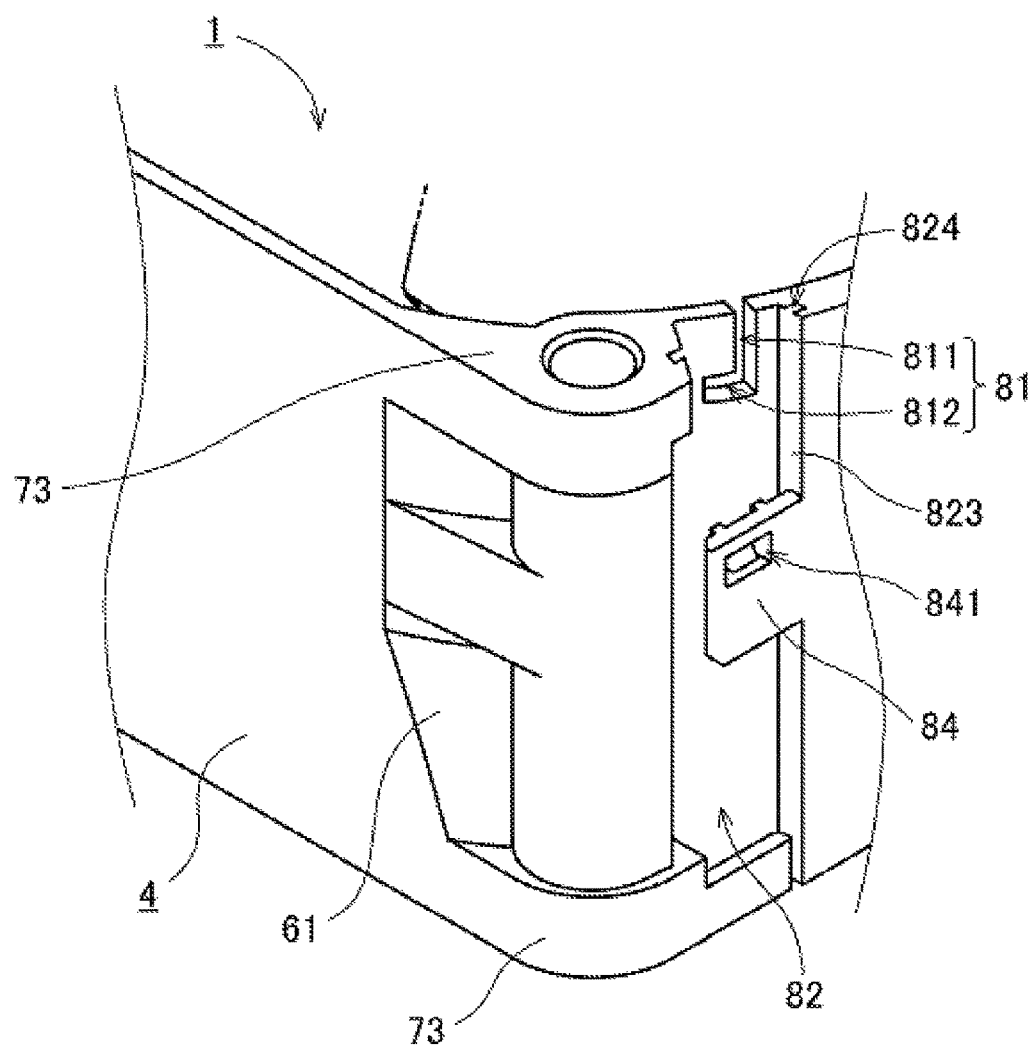
FIGS. 3 and 4 are partial perspective views of the fan motor according to the first preferred embodiment of the present invention.

Subsequently, the structure of the housing 4 of the fan motor 1 around the lead wire outlet port 81 will be described. FIG. 3 is a partial perspective view of the vicinity of the lead wire outlet port 81 in the housing 4 as viewed from the exhaust side.

As shown in FIG. 3, a notch-shaped lead wire outlet port 81 is provided at least in a part near the lower end of the tubular portion 61 of the fan motor 1. The lead wire outlet port 81 preferably includes an outlet port vertical portion 811 extending axially upward from the axial lower end portion of the tubular portion 61, and an outlet port horizontal portion 812 extending in the circumferential direction from at least a part of the outlet port vertical portion 811. The outlet port vertical portion 811 and the outlet port horizontal portion 812 are orthogonal to each other or intersect with each other. In FIG. 3, the lead wire outlet port 81 has an "L"-like cutout shape as seen from the radial inner side to the outer side. However, the shape of the lead wire outlet port 81 is not limited thereto. For example, the outlet port horizontal portion 812 may have an inclination with respect to the circumferential direction, and the outlet port vertical portion 811 may have an inclination with respect to the axial direction.

In FIG. 3, the outlet port horizontal portion 812 intersects with the upper end portion of the outlet port vertical portion 811. However, the present invention is not limited thereto. For example, the outlet port horizontal portion 812 may intersect with the middle of the outlet port vertical portion 811 in the axial direction.

As will be described later, one or more lead wires 60 led radially outward from the electric motor 2 pass through the lead wire outlet port 81. At that time, since the lead wire outlet port 81 includes the outlet port horizontal portion 812 having a wider circumferential width than the outlet port vertical portion 811, it becomes easier to hold the lead wires 60 passing through the lead wire outlet port 81. Furthermore, by allowing the lead wires 60 to pass through the outlet port horizontal portion 812, it is possible to prevent the lead wires 60 from coming off toward the lower side.

Further, the housing 4 is preferably provided with a vertical groove 82 which communicates with the lead wire outlet port 81 and penetrates the flange portion 73 in the axial direction. As will be described later, the guide member 83 is arranged in the vertical groove 82. It is desirable that the circumferential width of the vertical groove 82 is larger than the circumferential width of the lead wire outlet port 81. Thus, after the guide member 83 is inserted, a sufficient volume capable of accommodating the lead wires 60 can be secured in the portion of the vertical groove 82 radially inward of the guide member 83.

Figure 4:
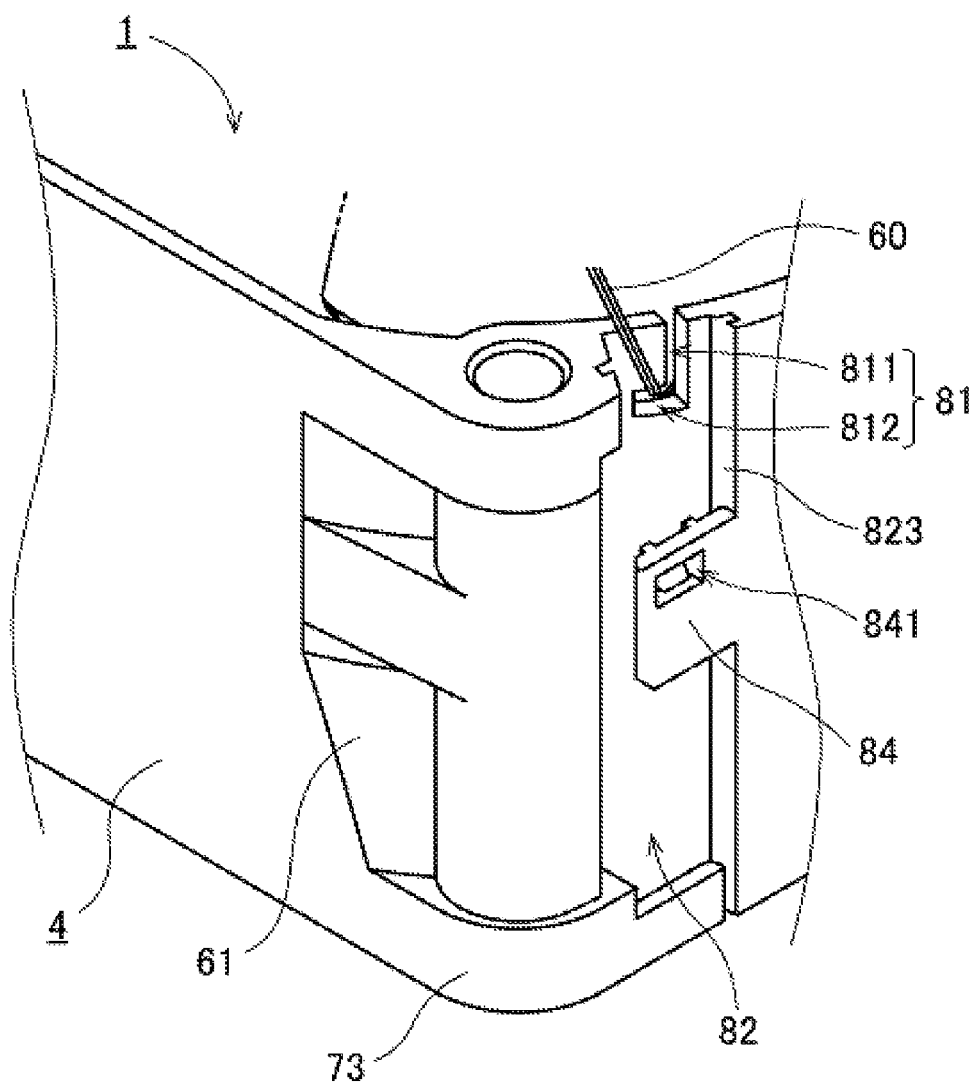

FIG. 4 is a partial perspective view of a state in which the lead wires 60 pass through the lead wire outlet port 81 in the housing 4, as viewed from the exhaust side. The lead wires 60 are electrically connected to the circuit board 65 of the electric motor 2. As shown in FIG. 4, the lead wires 60 are bent downward, for example, after passing through the notch-shaped lead wire outlet port 81 of the housing 4. When causing the lead wires 60 to pass through the lead wire outlet port 81, the lead wire 60 are first caused to pass through the lower end of the outlet port vertical portion 811 and are then horizontally moved in the outlet port horizontal portion 812 in the circumferential direction. This improves the wiring workability and makes it easier to hold the lead wires 60.

Figure 5:
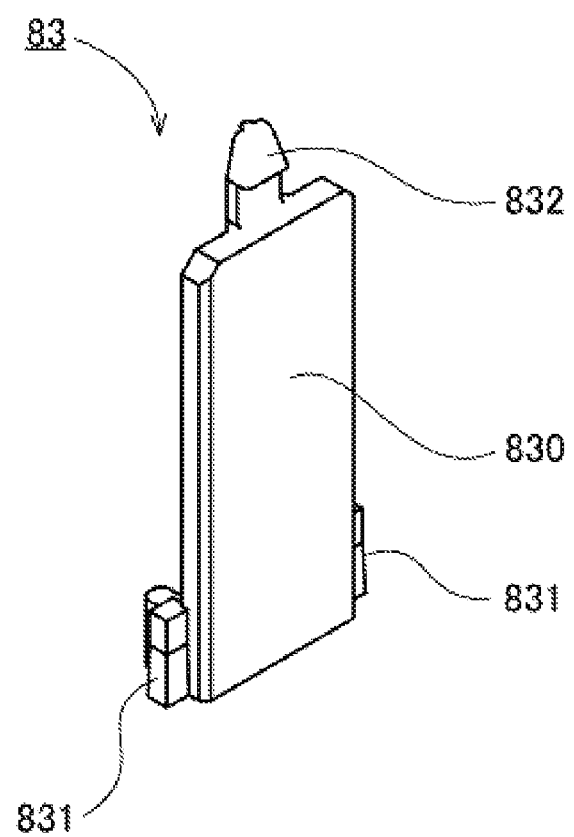
FIGS. 5 and 6 are perspective views of a guide member according to the first preferred embodiment of the present invention.
Figure 6:
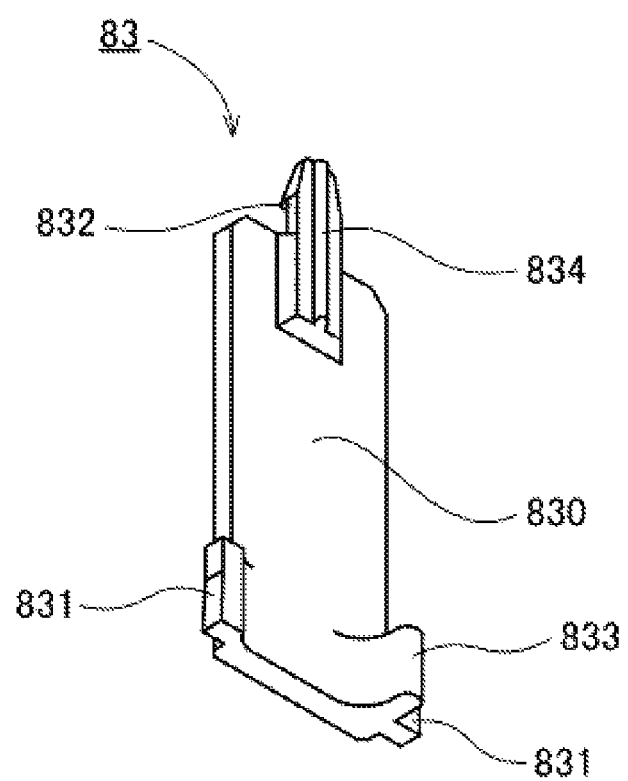

Subsequently, the structure of the guide member 83 will be described. FIG. 5 is a perspective view of the guide member 83 according to the present preferred embodiment as viewed from the radial outer side thereof. FIG. 6 is a perspective view of the guide member 83 as seen from the radial inner side thereof.

As shown in FIG. 5, the guide member 83 preferably includes a plate-like main body portion 830, a pair of convex portions 831, and a claw portion 832. The convex portions 831 protrude in the circumferential direction from both circumferential ends of the main body portion 830. The claw portion 832 is provided at the upper end of the main body portion 830. The circumferential width of the claw portion 832 is narrower than that of the main body portion 830. Moreover, as shown in FIG. 6, a protrusion portion 833 protruding inward in the radial direction is provided at a lower portion of the radial inner surface of the main body portion 830.

Figure 7:
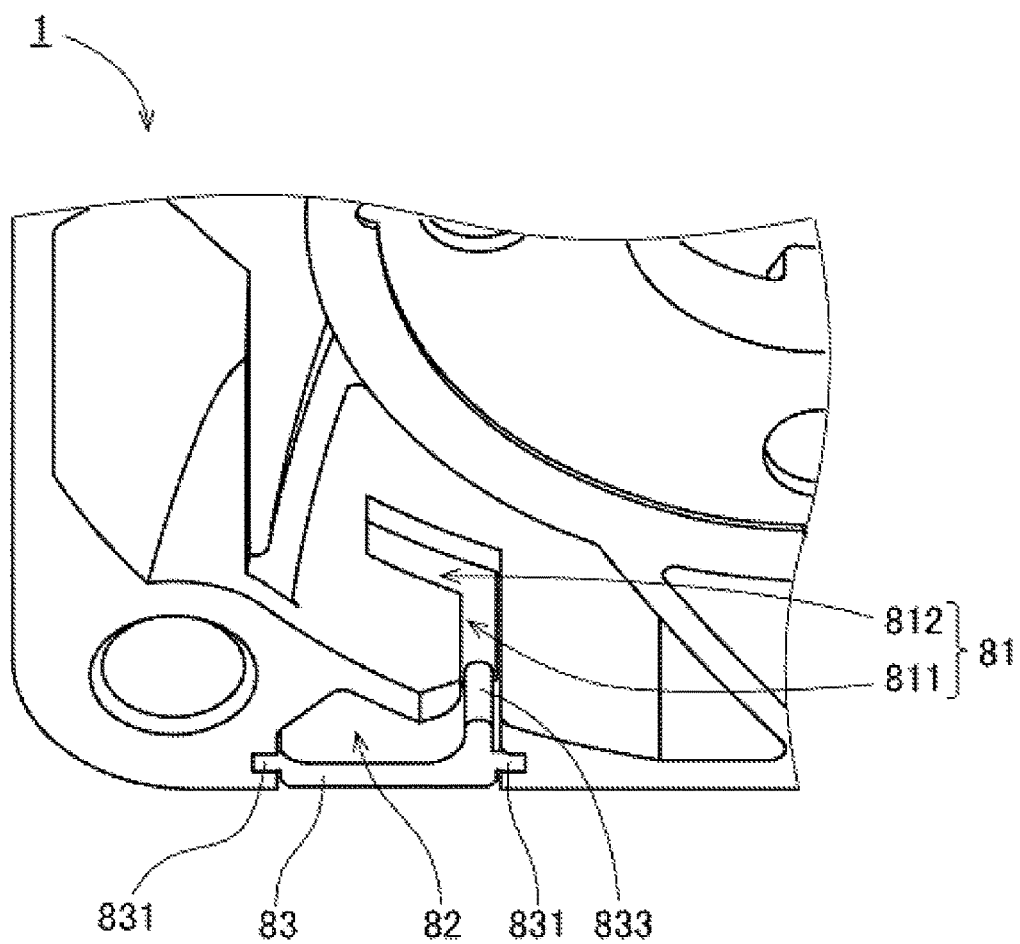
FIG. 7 is a partial perspective view of the fan motor according to the first preferred embodiment of the present invention.
Figure 8:
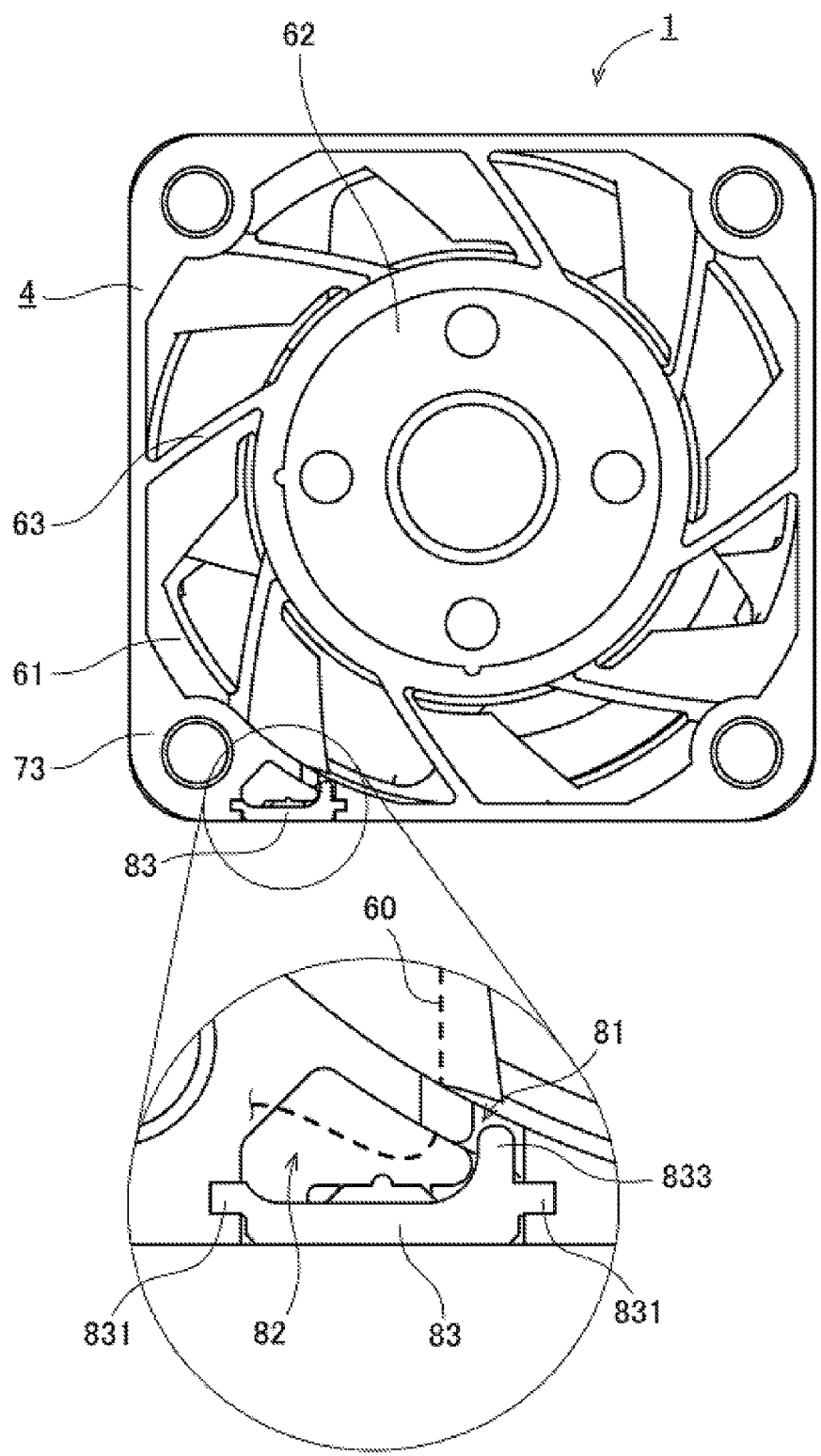
FIG. 8 is a bottom view of the fan motor according to the first preferred embodiment of the present invention.
Figure 9:
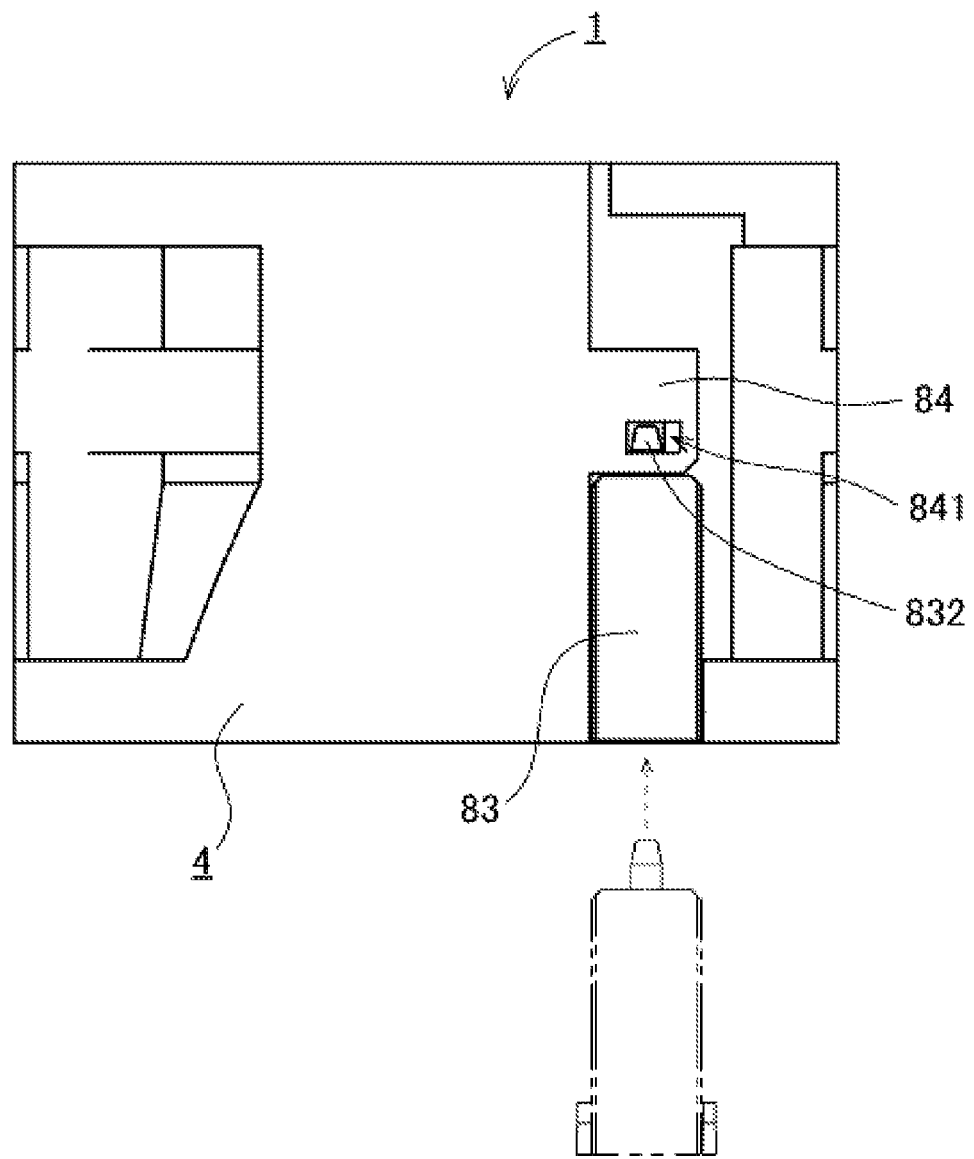
FIG. 9 is a side view of the fan motor according to the first preferred embodiment of the present invention.

FIG. 7 is a partial perspective view of the fan motor 1 according to the present preferred embodiment in a state in which the guide member 83 is inserted into the vertical groove 82, as viewed from the exhaust side. FIGS. 8 and 9 are a bottom view and a side view of the fan motor 1 in a state in which the guide member 83 is similarly inserted into the vertical groove 82. In FIGS. 7 to 9, the illustration of the lead wires 60 is omitted.

The guide member 83 is inserted into the vertical groove 82 from the lower side of the housing 4. The left and right convex portions 831 of the guide member 83 protrude on both sides in the circumferential direction. Further, as shown in FIG. 3, the housing 4 preferably includes concave portions 824 recessed in the circumferential direction at the lower end of a side wall 823 around the vertical groove 82 of the flange portion 73. When the guide member 83 is inserted into the vertical groove 82, the convex portions 831 of the guide member 83 are fitted into the respective concave portions 824. As a result, the radial movement of the guide member 83 is restricted.

In the present preferred embodiment, the convex portions 831 and the concave portions 824 are provided at two locations, respectively. However, the number of the convex portions 831 and the concave portions 824 is not limited thereto. For example, a convex portion may be provided only on one circumferential side of the side surface of the guide member 83. In addition, a concave portion may be provided only on one circumferential side of the side wall 823 around the vertical groove 82.

Returning to FIG. 3, the tubular portion 61 preferably includes a wall portion 84 protruding in the circumferential direction from the side wall 823 toward the vertical groove 82. Further, the wall portion 84 preferably has a through-hole 841 penetrating the wall portion 84 in the radial direction. As shown in FIG. 9, when the guide member 83 is inserted into the vertical groove 82, the claw portion 832 of the guide member 83 is elastically deformed radially inward to ride over the lower end of the wall portion 84 and is hooked in the through-hole 841. In a state in which the claw portion 832 is hooked in the through-hole 841, the lower surface of the claw portion 832 and the lower surface of the through-hole 841 are in contact with each other. Thus, the guide member 83 is prevented from coming off toward the lower side. As a result, the guide member 83 is strongly fixed to the vertical groove 82. As shown in FIG. 6, the claw portion 832 preferably includes a reinforcing portion 834 protruding radially inward on the radial inner surface thereof. Thus, the strength and durability of the claw portion 832 are improved. The wall portion 84 may protrude from the tubular portion 61 in the radial direction instead of the circumferential direction.

As a modification of FIG. 9, the claw portion 832 may be hooked to the axial upper end of the wall portion 84. In this case, it is unnecessary to provide the through-hole 841 in the wall portion 84, which facilitates designing and improves productivity.

As another modification, the claw portion 832 may not be provided in the guide member 83 but may be provided in the tubular portion 61. In this case, the claw portion 832 provided in the tubular portion 61 protrudes toward the guide member 83 and is hooked to the guide member 83, whereby the guide member 83 is strongly fixed to the vertical groove 82. Further, the claw portion 832 may be provided in the wall portion 84 protruding from the tubular portion 61 in the circumferential direction. The claw portion 832 may be hooked to the guide member 83.

Subsequently, the structure of the protrusion portion 833 will be described.

As shown in FIG. 6, the guide member 83 preferably includes the protrusion portion 833 in the lower end portion thereof. The circumferential width of the protrusion portion 833 is smaller than the circumferential width of the outlet port vertical portion 811 of the lead wire outlet port 81. As shown in FIGS. 7 and 8, when the guide member 83 is inserted into the vertical groove 82, the protrusion portion 833 is fitted into the outlet port vertical portion 811. As a result, at least a part of the vicinity of the lower end portion of the outlet port vertical portion 811 is closed.

When manufacturing the fan motor 1, after the lead wires are passed through the lead wire outlet port 81 and bent downward, the guide member 83 is inserted into the vertical groove 82. At that time, the convex portions 831 of the guide member are fitted to the respective concave portions 824, the claw portion 832 is hooked, and the protrusion portion 833 closes at least a part of the vicinity of the lower end of the outlet port vertical portion 811. Thus, the portions of the lead wires 60 penetrating the lead wire outlet port 81 are disposed on the upper side of the protrusion portion 833 within the lead wire outlet port 81. As a result, the removal and detachment of the lead wires 60 from the lead wire outlet port 81 are suppressed.

As shown in FIGS. 6 to 8, when the guide member 83 is inserted into the vertical groove 82, the protrusion portion 833 of the guide member 83 protrudes radially inward near the circumferential end of the guide member 83 which is closer to the rotation axis 9 of the electric motor 2. In the present preferred embodiment, the lead wires 60 passes through the outlet port vertical portion 811 and is horizontally moved in the circumferential direction in the outlet port horizontal portion 812 to move away from the rotation axis 9 of the electric motor 2. The radial width of the flange portion 73 increases as going away from the rotation axis 9. Therefore, the width of the vertical groove 82 communicating with the lead wire outlet port 81 can also be increased. As a result, it is possible to increase the volume of the inner region of the vertical groove 82 that exists radially inward of the guide member 83 and accommodates the lead wires 60.

When the guide member 83 is inserted, at least a part of the lead wires 60 passes through the lead wire outlet port 81 and extends downward from the inside of the vertical groove 82. At that time, the lead wires 60 are accommodated radially inward of the guide member 83 in the vertical groove 82 by the guide member 83. Thus, the lead wires 60 are prevented from coming off and deflecting radially outward from the housing 4. As a result, it is possible to suppress damage on the outside of the housing 4 due to the contact of the lead wires 60 or the like.

Further, in the present preferred embodiment, when the guide member 83 is inserted into the vertical groove 82, at least a part of the radial outer surface of the guide member 83 is exposed to a space existing radially outward of the housing 4. Therefore, a worker can insert the guide member 83 into the vertical groove 82 while holding the radial outer surface of the guide member 83. This improves workability at the time of inserting the guide member 83. In addition, it is easy to secure the radial thickness of the tubular portion 61 of the housing 4. Thus, the durability is improved.

However, the radial outer surface of the guide member 83 may be covered by the housing 4. This makes it easy for the housing 4 to hold the guide member 83. It is also possible to prevent the guide member 83 from coming off.

While the exemplary preferred embodiment of the present invention has been described above, the present invention is not limited to the above-described preferred embodiment.

First, the lead wire outlet port 81 and the vertical groove 82 may be provided on the intake side instead of or in addition to the exhaust side of the housing 4. For example, when the circuit board of the electric motor 2 is disposed on the intake side, it is preferable that the lead wire outlet port 81 and the vertical groove 82 are provided on the intake side of the housing 4.

At least a part of the lead wires 60 may extend from the inside of the vertical groove 82 toward the intake side after passing through the lead wire outlet port 81.

Furthermore, when inserted into the vertical groove 82, the guide member 83 may be fixed by press-fitting, bonding or welding in the vertical groove 82 instead of or in addition to being fixed using the concave-convex structure and the hook structure. In this case, the guide member 83 may be inserted into the vertical groove 82 not from the lower side of the housing 4 but from the radial outer side or from the circumferential direction.

Figure 10:
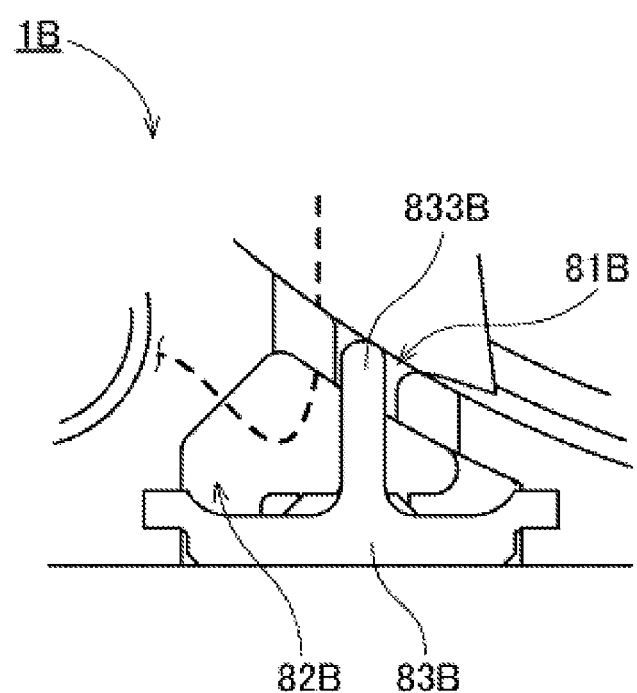
FIG. 10 is a partial bottom view of a fan motor according to a preferred modification of the present invention.
Figure 11:
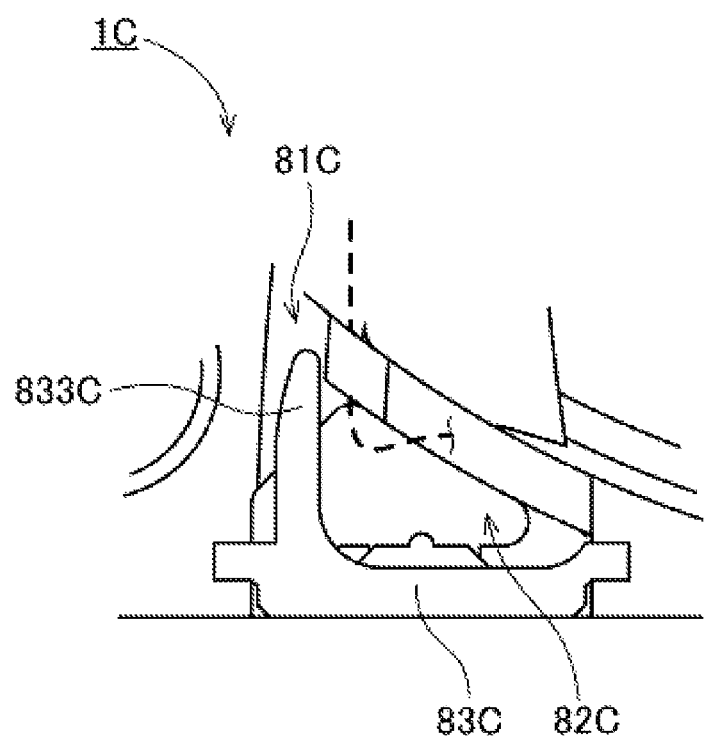
FIG. 11 is a partial bottom view of a fan motor according to another preferred modification of the present invention.

FIGS. 10 and 11 are partial bottom views of fan motors 1B and 1C according to modifications. As shown in FIG. 10, it may be possible to adopt a structure in which when a guide member 83B is inserted into a vertical groove 82B, a protrusion portion 833B of the guide member 83B protrudes radially inward near the circumferential center of the guide member 83B and fits to the lower portion of a lead wire outlet port 81B. Further, as shown in FIG. 11, it may be possible to adopt a structure in which when a guide member 83C is inserted into a vertical groove 82C, a protrusion portion 833C protrudes radially inward near the circumferential end of the guide member 83C which is farther from the rotation axis 9 and fits to the lower portion of a lead wire outlet port 81C.

Figure 12:
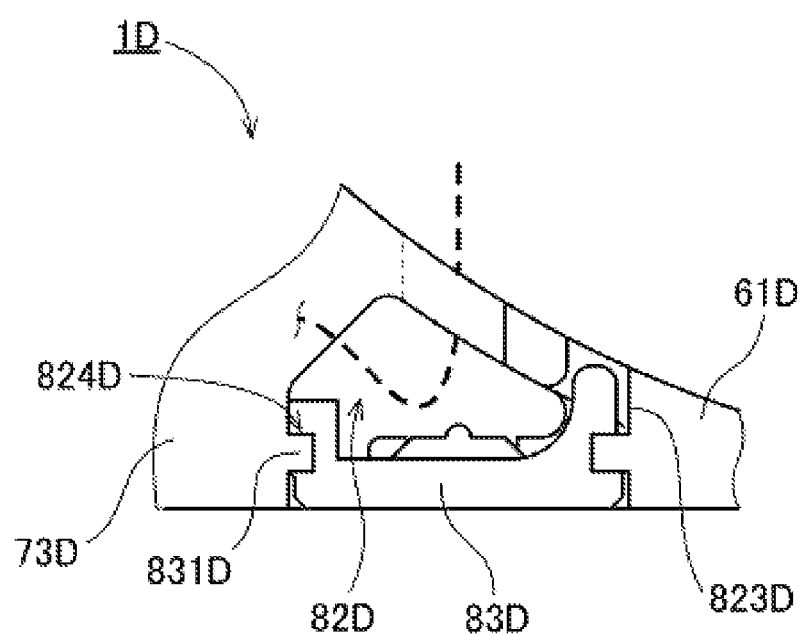
FIG. 12 is a partial bottom view of a fan motor according to a further preferred modification of the present invention.

FIG. 12 is a partial bottom view of a fan motor 1D according to a further modification. As shown in FIG. 12, a guide member 83D may include a concave portion 824D recessed in the circumferential direction, and a convex portion 831D protruding in the circumferential direction may be provided at the lower end of a side wall 823D of a flange portion 73D around a vertical groove 82D. It may be possible to adopt a structure in which when the guide member 83D is inserted into the vertical groove 82D, the convex portion 831D fits to the concave portion 824D. With this structure, the radial movement of the guide member 83 can be similarly suppressed.

Further, the shapes of the detailed parts of the fan motor may be different from the shapes shown in the respective drawings of the present invention. In addition, the respective elements appearing in the above preferred embodiment and modifications may be appropriately combined unless a conflict arises.

The present invention can be applied to a fan motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fan motor, comprising:
an electric motor including a stationary unit and a rotary unit arranged to rotate about a vertically extending rotation axis;
an impeller including a plurality of blades extending radially and rotating together with the rotary unit about the vertically extending rotation axis;
a housing arranged to accommodate the electric motor and the impeller therein;
one or more lead wires connected to the electric motor and extending radially outward; and
a plate-shaped guide member, wherein
the housing includes a tubular portion extending along the rotation axis and arranged to accommodate at least a portion of the impeller therein, a flange portion protruding radially outward from at least a portion of the tubular portion, a lead wire outlet port provided in at least a portion of the tubular portion, and a vertical groove communicating with the lead wire outlet port and penetrating the flange portion in an axial direction, the guide member is disposed inside the vertical groove, and all portions of the one or more lead wires are positioned radially inward of all portions of the guide member in the vertical groove.

2. The fan motor of claim 1, wherein the guide member includes a convex portion protruding in a circumferential direction, the flange portion includes a concave portion recessed in the circumferential direction around the vertical groove, and the convex portion fits to the concave portion.

3. The fan motor of claim 1, wherein the guide member includes a concave portion recessed in a circumferential direction, the flange portion includes a convex portion protruding in the circumferential direction around the vertical groove, and the convex portion is fitted in the concave portion.

4. The fan motor of claim 1, wherein the guide member is fixed in the vertical groove by press-fitting, bonding or welding.

5. The fan motor of claim 1, wherein the guide member includes a free-standing protrusion portion which protrudes radially inward, and a tip of the free-standing protrusion portion is fitted in the lead wire outlet port.

6. The fan motor of claim 5, wherein the free-standing protrusion portion protrudes radially inward near a circumferential end of the guide member which is closer to the rotation axis.

7. The fan motor of claim 5, wherein the free-standing protrusion portion protrudes radially inward near a circumferential center of the guide member.

8. The fan motor of claim 5, wherein the free-standing protrusion portion protrudes radially inward near a circumferential end of the guide member which is farther from the rotation axis.

9. The fan motor of claim 1, wherein the circumferential width of the vertical groove is larger than the circumferential width of the lead wire outlet port.

10. The fan motor of claim 1, wherein the lead wire outlet port includes an outlet port vertical portion extending in the axial direction from an axial end of the tubular portion and an outlet port horizontal portion extending in a circumferential direction from at least a part of the outlet port vertical portion, and the outlet port vertical portion and the outlet port horizontal portion are orthogonal to each other or intersect with each other.

11. The fan motor of claim 1, wherein the tubular portion includes a wall portion protruding in a circumferential direction, the guide member includes a claw portion protruding toward the wall portion, and the claw portion is hooked to the wall portion.

12. The fan motor of claim 11, wherein the wall portion includes a through-hole penetrating the wall portion, and the claw portion is hooked in the through-hole.

13. The fan motor of claim 11, wherein the claw portion is hooked to an axial end of the wall portion.

14. The fan motor of claim 11, wherein the claw portion has a narrower circumferential width than the guide member, and the claw portion includes a reinforcing portion protruding radially inward.

15. The fan motor of claim 1, wherein at least a portion of a radial outer surface of the guide member is exposed to a space outside the housing.

16. The fan motor of claim 1, wherein a radial outer surface of the guide member is covered by the housing.

17. The fan motor of claim 1, wherein at least a portion of the one or more lead wires extends downward from within the vertical groove.

18. The fan motor of claim 1, wherein at least a portion of the one or more lead wires extends upward from within the vertical groove.

19. The fan motor of claim 1, wherein the guide member is affixed to the housing by being axially inserted into the housing in a direction parallel to the vertically extending rotation axis.

* * * * *